United States Patent [19]

Stevens et al.

[11] Patent Number: 4,927,539

[45] Date of Patent: May 22, 1990

[54] HIGH PERFORMANCE ANION-EXCHANGE CHROMATOGRAPHIC PACKING COMPOSITION CONSISTING OF LOW POROSITY SYNTHETIC RESIN GEL PARTICLE SUBSTRATE COATED WITH LIQUID WATER-SOLUBLE AMINATED RESIN

[75] Inventors: Timothy S. Stevens; Martin A. Langhorst; Osro W. Randall, III, all of Midland, Mich.

[73] Assignee: The Dow Chemical Company, Midland, Mich.

[21] Appl. No.: 262,074

[22] Filed: Oct. 24, 1988

Related U.S. Application Data

[63] Continuation of Ser. No. 490,268, May 2, 1983, abandoned.

[51] Int. Cl.⁵ ..................... B01D 15/08; C08D 5/20
[52] U.S. Cl. ................................. 210/635; 210/656; 210/198.2; 210/502.1; 521/28
[58] Field of Search .......................... 521/28; 210/635

[56] References Cited

U.S. PATENT DOCUMENTS

| | | | |
|---|---|---|---|
| 2,687,374 | 8/1954 | Mowry et al. | 210/679 |
| 2,883,356 | 4/1959 | Gluesempamp | 521/28 |
| 3,243,369 | 3/1966 | Dekking | 521/28 |
| 3,250,704 | 5/1966 | Fevendinky | 521/28 |
| 3,267,065 | 8/1966 | Shaler et al. | 521/28 |
| 3,485,658 | 12/1969 | Jler | 521/28 |
| 3,887,496 | 6/1975 | Cornia et al. | 252/500 |
| 3,997,483 | 12/1976 | Wurster et al. | 210/679 |
| 4,101,460 | 7/1978 | Small et al. | 521/28 |
| 4,351,909 | 9/1982 | Stevers et al. | 521/28 |
| 4,376,047 | 3/1983 | Pohl | 521/28 |

FOREIGN PATENT DOCUMENTS 1544867  4/1977  United Kingdom .

Primary Examiner—Joseph L. Schofer
Assistant Examiner—Peter F. Kulkosky
Attorney, Agent, or Firm—Burke M. Halldorson; Wendy B. Buskop; Timothy S. Stevens

[57] ABSTRACT

An anion-exchange chromatographic packing composition which comprises:

a substrate which consists essentially of particles having cation-exchanging sites at least on their available surfaces, the particles being of a diameter of between about 1 to about 75 microns; and a liquid coating which consists essentially of a hydrophilic, water soluble, film forming resin having anion-exchanging sites which attract available cation-exchanging sites of the substrate, wherein the liquid coating is retained by electrostatic bonds on the available surfaces of the substrate particles. The invention further includes a chromatographic column and process using the described packing composition.

6 Claims, 1 Drawing Sheet

HIGH PERFORMANCE ANION-EXCHANGE CHROMATOGRAPHIC PACKING COMPOSITION CONSISTING OF LOW POROSITY SYNTHETIC RESIN GEL PARTICLE SUBSTRATE COATED WITH LIQUID WATER-SOLUBLE AMINATED RESIN

This is a continuation of application Ser. No. 490,268, filed May 2, 1983 now abandoned.

FIELD OF THE INVENTION

The invention relates to a high performance anion-exchange chromatographic packing composition.

BACKGROUND OF THE INVENTION

Since the inception of ion chromatography (U.S. Pat. No. 3,920,397), the basic technology for the anion-exchanger used in the analytical column for anion determination has not changed. Solid microparticles of anion-exchanger are agglomerated with macroparticles of surface sulfonated or fully sulfonated styrene divinylbenzene copolymer to produce a low capacity "pellicular type" anion-exchanger (U.S. Pat. No. 4,101,460).

Improvements within this basic technology came with the use of monodisperse anion-exchange latex rather than the previously used ground anion-exchange resins (as described in the '460 patent), and by performing an agglomeration step in a polyvalent salt solution (U.S. Pat. No. 4,119,580). The use of monodisperse anion-exchange latex eliminated the problem of refining ground ion-exchange resin to obtain the desired size range, while agglomerating in a polyvalent salt solution resulted in a reproducible and dense deposition of microparticles due to the resulting suppression of the anionic repulsion forces between the microparticles.

A further improvement is disclosed by U.S. Pat. No. 4,383,047 wherein the use of smaller diameter latex microparticles is prescribed. Anion-exchangers of this type achieve a performance level in which baseline separation of fluoride, chloride, nitrite, phosphate, bromide, nitrate, and sulfate ions is completed in about 6 minutes (illustrated by the chromatogram in FIG. 3 of the '047 patent).

Throughout these developments in the technology the packing compositions have been limited to eluent insoluble resins for both the agglomerated and substrate components. There has not been any suggestion that other types of components could be useful or practicable.

SUMMARY OF THE INVENTION

The invention is an anion-exchange chromatographic packing composition which comprises:

a substrate which consists essentially of particles having cation-exchanging sites at least on their available surfaces, the particles being of a diameter between about 1 to about 75 microns; and a liquid coating which consists essentially of a hydrophilic, water soluble, film forming resin having anion-exchanging sites which attract available cation-exchanging sites of the substrates, wherein the liquid coating is retained by electrostatic bonds on the available surfaces of the substrate particles.

The invention also encompasses a chromatographic column using the described packing composition and a chromatographic separation process using the described packing composition.

DETAILED DESCRIPTION OF THE INVENTION

Figure 1:
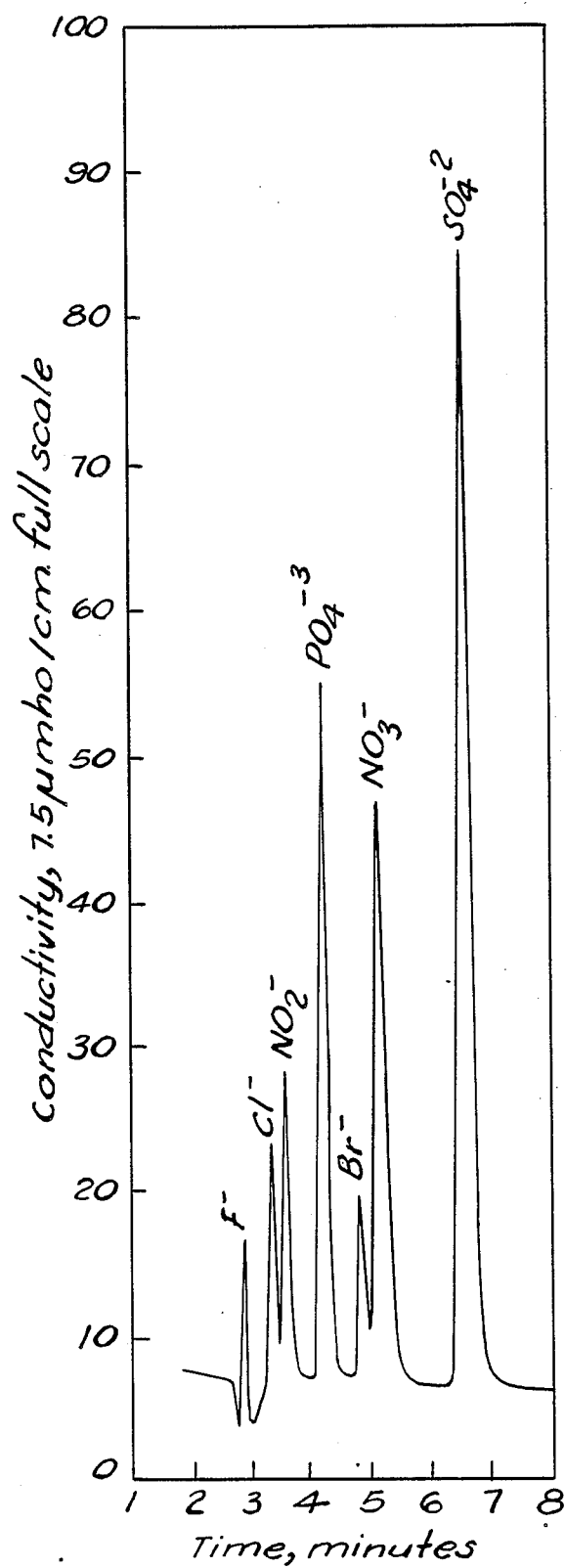
FIG. 1 reproduces an actual chromatogram developed by the high performance packing composition of one embodiment of the invention.

According to the present invention substrate particles, typically resin beads, serve to firmly retain a liquid coating which includes active anion-exchange sites used for chromatographic separation. Each substrate particle is insoluble in the solvent systems used for separation. They are suitably formed of resin beads, preferably substantially spherical in shape, of from about 1 to about 75 microns diameter and preferably about 3 to about 20 microns. Highly preferred for use in the invention are particles which in diameter are from about 4 to about 10 microns.

Suitable compositions for the substrate particles are well known in the art and are discussed in detail in U.S. Pat. No. 4,351,909 and in U.S. Pat. No. 4,383,047, both of which are hereby incorporated by reference. In the present invention, the particles may be "macroporous" as described in the '909 patent, resulting in chromatographic columns having higher capacities but longer analysis times, or the particles preferably may be of low porosity, as described in the '047 patent, to yield columns having shorter analysis times. Particles having low porosity are known in the art as gel type resins and are exemplified by the DOWEX® 50W ion-exchange resins. As in both of the references cited, the substrate particles preferably are monodisperse with respect to their diameters.

Due to the nature of the electro-static bonds which form with the liquid coating, the available surfaces of the substrate particles preferably are relatively "hard" rather than swollen. This means that substrate particles of the gel type resins should have a relatively high degree of crosslinking. Good results have been achieved with crosslinking of about 35 percent within the particles.

Glass or silica beads, also known in the art as suitable substrate particles, provide the "hard" surfaces of the preferred particles. Basic eluents, however, have been found to remove the liquid coating on glass beads. In practicing the invention, therefore, glass beads may be used for the substrate except where a basic eluent, having a pH of about 8 or more, will be used with the packing composition, in which case a synthetic resin is preferred.

The anion-exchanging packing composition of the invention further comprises a hydrophilic, water soluble, film forming resin. The resin has anion-exchanging sites which attract the available sites of the substrate particles and thereby form a liquid coating on the available surfaces of the particles.

Among suitable materials for the anion-exchange liquid coating are the well known water soluble aminated poly(vinylaromatic) resins such as the quaternary ammonium electroconductive resins discussed in detail in U.S. Pat. No. 3,887,496 (in particular, at column 2, lines 34–47). Preferred for use are poly(vinylaromatic) resins having anion-exchanging sites substantially throughout the entirety of a majority of the polymer chains. The anion-exchanging sites may be either strong base, generally quaternary ammonium functional groups, or weak base, generally tertiary, secondary and primary amine functional groups.

COLUMN PREPARATION

Columns using the packing compositions of the invention are desirably prepared by first efficiently packing the column with the substrate particles, and then adding a solution of the liquid coating resin using an in situ coating method. The amount of resin which coats onto the substrate particles by electrostatic attraction is self-limiting and the excess resin will wash out of the column.

To assure a proper bonding between the substrate and the liquid coating, the substrate particles should not contact any surfactants or other agents which could interfere with the electrostatic attraction between the coating and substrate particles. The particles should be thoroughly cleansed of any such surfactant or agent if contact cannot be avoided.

The invention, in its broadest sense, additionally embraces alternative methods for preparing the packed column or packing composition described. One such alternate method is that disclosed in U.S. Pat. No. 4,119,580 wherein the substrate particles are added to a solution of the liquid coating resin in an aqueous solution of a polyvalent salt, followed by a conventional column packing procedure using the precoated packing resulting from this preparation. For said teachings, the referenced U.S. Pat. Nos. 4,101,460 and 4,119,580 are incorporated into this disclosure by reference.

Like the composition claimed in U.S. Pat. No. 4,101,460, the anion-exchange compositions of the present invention have been found to be stable. The liquid coating is irreversibly attached to the available surfaces of the substrate particles such that a substantial amount of the coating will not be displaced by eluents normally used in the art, such as electrolyte solutions of 0.1M or less. Shearing forces, such as those encountered when a liquid passes through an ion-exchange bed at elevated flow rates, also will not displace a substantial amount of the liquid coating.

EXAMPLE

Chromatographic Conditions

The following chromatographic conditions were used to evaluate the packed chromatographic column described in the example, below.

Column: 9×242 mm, 10–20μ DOWEX® 50W×35 treated with quaternized polystyrene
Eluent: 0.0024 molar $Na_2CO_3$ 0.003 molar $NaHCO_3$
Flow Rate: 138 ml/hour
Stripper Column: 2.8×300 mm DOWEX® 50W×16, $H^+$ form resin 200–400 mesh
Injection Volume: 50 microliter loop
Detection: conductivity at 7.5μ Mho $cm^{-1}$ full scale deflection

Sample Standard

The following seven ion standard was used as a 4× dilution:
$F^-$: 3.3 ppm
$Cl^-$: 4 ppm
$NO_2^-$: 10 ppm
$PO_4^{-3}$: 54 ppm
$Br^-$: 10 ppm
$NO_3^-$: 34 ppm
$SO_4^=$: 50 ppm The above conditions and standard solution are widely used for the evaluation of ion chromatographic analytical columns (see U.S. Pat. No. 4,119,580).

EXAMPLE

To compare the performance of one embodiment of the present invention to that of columns already known in the art, a "suction packed" column was prepared with the substrate as described above on which a water soluble aminated polystyrene resin was coated. The packing method used is described in detail in U.S. Pat. No. 4,383,047.

An actual chromatogram which resulted from the use of the column of this example is reproduced in FIG. 1. This Figure clearly indicates that the column achieved good separation of the components of the seven ion standard solutions within approximately seven minutes.

What is claimed is:

1. A chromatographic analytical column, the column containing a packed bed of an anion-exchange chromatographic packing which comprises:
a substrate which consists essentially of insoluble synthetic resin particles of the low porosity gel type, having cation-exchanging sites at least on their available surfaces, the particles being of a diameter of between 1 to about 75 microns; and
a chromatographically active anion-exchange liquid coating irreversibly attached to the available surfaces of the substrate particles, the liquid coating consisting essentially of hydrophilic, water soluble, film forming aminated resin having anion-exchanging sites which attract available cation-exchanging sites of the substrate, wherein the liquid coating is retained by electrostatic bonds on the available surfaces of the substrate particles.

2. The packed column of claim 1 comprising the substrate consisting essentially of particles of between about 3 to about 20 microns diameter.

3. The packed column of claim 1 comprising the substrate consisting essentially of particles of between about 4 to about 10 microns diameter.

4. The packed column of claim 1 comprising the substrate wherein the particles are monodisperse.

5. The packed column of claim 1 comprising the liquid coating consisting essentially of a water soluble aminated poly(vinylaromatic) resin.

6. A process for chromatographic separation of diverse anions comprising:
passing a liquid solution comprising the anions through a bed comprising a substrate which consists essentially of insoluble synthetic resin particles of the low porosity gel type, having cation-exchange sites at least on their available surfaces, the particles being of a diameter between about 1 to about 75 microns, and a chromatographically active anion-exchange liquid coating irreversibly attached to the available surfaces of the substrate particles, the liquid coating consisting essentially of hydrophilic, water soluble, film forming aminated resin having anion-exchanging sites which attract available cation-exchanging sites of the substrate, wherein the liquid coating is retained by electrostatic bonds on the available surfaces of the substrate particles, and wherein anion-exchanging sites at least on the surface of the liquid coating attract at least on of said anions; and
eluting the bed with an eluent which differentially removes the attracted anions from the bed.

* * * * *